sts Patent Office 3,484,394
Patented Dec. 16, 1969

3,484,394
HEAT-SENSITIVE LATEX
Norman G. Holdstock, Scotia, N.Y., assignor to General
Electric Company, a corporation of New York
No Drawing. Filed June 7, 1967, Ser. No. 644,055
Int. Cl. C08d 7/16; C08c 7/16
U.S. Cl. 260—3                 6 Claims

ABSTRACT OF THE DISCLOSURE

Heat-sensitive rubber or resin latices comprise 100 parts by weight of rubber or resin solids in latex and from about 0.05 to 10 parts by weight of siloxane-oxyalkylene block copolymers in which the oxyalkylene portion of the copolymer is attached to the siloxane portion of the copolymer through carbamate linkages. These copolymers are prepared by reacting an alkenyl isocyanate with a polyalkylene glycol monoether to form a urethane and then reacting the urethane with an organopolysiloxane containing silicon-bonded hydrogen groups. The heat-sensitive latices are useful in the manufacture of thin-walled rubber articles by immersing a heated mold into the heat-sensitive latex to cause formation of a film of rubber about the surface of the mold.

---

This invention relates to heat-sensitive latex compositions. In particular, this invention relates to heat-sensitive compositions of natural rubber or synthetic rubber or resin latices containing minor amounts of specific siloxane-oxyalkylene copolymers which sensitize the latex so that it coagulates upon reaching a certain temperature.

It is known that certain latex compositions coagulate when brought into contact with heated mold surfaces. It is also known that most latices do not exhibit this property unless they are specially sensitized by the addition of suitable materials. Thus, some nitrile rubber latices have been sensitized by the addition of calcium nitrate-methanol coagulants. Various siloxane-oxyalkylene copolymers have also been used as sensitizers for various latices. Certain of these materials are described in U.S. Patents 3,246,339—Sinn et al., 3,255,140—Sinn et al., and 3,255,141—Damm et al. However, all of these prior art sensitizing agents have suffered the disadvantage that they are useful for only specific types of latices or that a given amount of the sensitizer does not reduce the coagulation temperature enough to make the sensitized solution economically satisfactory.

The present invention is based on my discovery of a broad class of sensitized latex compositions of improved sensitivity with a minimum amount of sensitizer present in the composition.

The sensitized compositions of the present invention comprises a natural rubber or synthetic rubber or resin latex and a sensitizing amount of a siloxane-oxyalkylene copolymer having the formula:

(1) [R'(OC$_n$H$_{2n}$)$_x$OOCNH—A—CH$_2$CH$_2$]$_a$(R)$_b$SiO$_{\frac{4-a-b}{2}}$
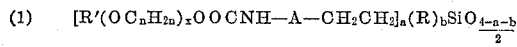

where R is an organic radical attached to silicon through a silicon-carbon linkage, R' is a member selected from the class consisting of lower alkyl radicals, e.g., alkyl radicals containing from 1 to 7 carbon atoms, and aryl radicals; A is a divalent hydrocarbon radical containing no more than about 7 carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5, e.g., from 5 to 100 or more.

The siloxane-oxyalkylene copolymers of Formula 1 are described and claimed in the copending application of Robert J. Boudreau, Ser. No. 644,047 filed concurrently herewith and assigned to the same assignee as the present invention. This copending application is hereby incorporated by reference into the present application for purposes of illustrating various siloxane-oxyalkylene copolymers within the scope of Formula 1 and giving the details of preparation and composition of such copolymers.

The radicals represented by the various letters appearing in Formula 1 are well known in the art and are typified by the radicals usually associated with silicon-bonded organic groups in the case of R, the radicals generally associated with monoalkyl ethers of polyalkylene glycols in the case of R', and the usual divalent hydrocarbon radicals in the case of A.

The organic radicals represented by R in Formula 1 include monovalent hydrocarbon radicals, halogenated monovalent hydrocarbon radicals, and cyanoalkyl radicals. Illustrative of specific radicals within the scope of these classes can be mentioned, for example, alkyl radicals, e.g., methyl, ethyl, propyl, butyl, octyl, etc. radicals; aryl radicals, e.g., phenyl, tolyl, xylyl, naphthyl, etc, radicals; aralkyl radicals, e.g., benzyl, phenylethyl, etc. radicals; olefinically unsaturated monovalent hydrocarbon radicals, e.g., vinyl, allyl, cyclohexenyl, etc. radicals; cycloalkyl radicals, e.g., cyclohexyl, cycloheptyl, etc. radicals; halogenated monovalent hydrocarbon radicals, e.g., chloromethyl, dichloropropyl, 1,1,1-trifluoropropyl, chlorophenyl, dibromophenyl, etc. radicals; cyanoalkyl radicals, e.g., cyanoethyl, cyanopropyl, etc. radicals.

The lower alkyl radicals within the scope of R' of Formula 1 include, for example, alkyl radicals containing from 1 to 7 carbon atoms, both straight chain and branched chain. The aryl radicals within the scope of R' include phenyl, tolyl, xylyl, naphthyl, etc. radicals. Illustrative of the divalent hydrocarbon radicals within the scope of A of Formula 1 are divalent aliphatic hydrocarbon radicals, such as methylene and ethylene as well as divalent aromatic hydrocarbon radicals, such as the various isomeric phenylene radicals and substituted phenylene radicals. In the preferred embodiment of my invention, R is methyl, R' is a lower alkyl radical such as butyl, and A is methylene.

The siloxane-oxyalkylene copolymers employed in the practice of the present invention can best be understood by their method of preparation. This method of preparation involves the reaction of an unsaturated isocyanate having the formula:

(2)            OCN—A—CH=CH$_2$ with the monoalkyl or monoaryl ether of a polyalkylene glycol having the formula:

(3)            R'(OC$_n$H$_{2n}$)$_x$OH

to form a urethane having the formula:

(4)      R'(OC$_n$H$_{2n}$)$_x$OOCNH—A—CH=CH$_2$

The urethane of Formula 4 is then reacted with an organohydrogenpolysiloxane having the formula:

(5)            (H)$_a$(R)$_b$SiO$_{\frac{4-a-b}{2}}$

to form the copolymer of Formula 1. In the above Formulae 2 through 5, the various letters and subscripts are as previously defined with respect to Formula 1.

The isocyanates within the scope of Formula 2 are well known in the art, with the most common and preferred member of the class being allyl isocyanate, which is within the scope of Formula 2 when A is methylene. Also of interest and use in the practice of the present invention are other isocyanates within the scope of Formula 2, such as p-vinylphenyl isocyanate, vinylethyl isocyanate, etc.

The polyalkylene glycol monoethers within the scope of Formula 3 are well known in the art and, while any of such polyalkylene glycol monoethers can be employed in the practice of the present invention, it is preferred to have $x$ equal to slightly more than 5 as a minimum so as to produce the preferred polyalkylene glycol monoethers employed in the present invention which are those having a molecular weight of from about 300 to 5,000. As indicated by Formula 3, the oxyalkylene groups can contain from 2 to 4 carbon atoms and can be, for example, oxyethylene, oxypropylene-1,2, oxypropylene-1,3, oxybutylene-1,2, etc. The monoether of Formula 3 can contain all similar oxyalkylene groups or can contain a mixture of oxyalkylene groups. In the preferred embodiment of my invention, the oxyalkylene groups are a mixture of oxyethylene groups and oxypropylene-1,2 groups. Where such a mixture of groups is employed, it is preferred to have the oxyethylene groups constitute from about 25 to 75 percent by weight of the total weight of the monoether.

The organohydrogenpolysiloxanes within the scope of Formula 5 are also well known in the art and contain an average of from about 0.50 to 1.00 silicon-bonded hydrogen atoms per silicon atom. Since there are more than 2.00 total hydrogen atoms and R groups per silicon atom in the organohydrogenpolysiloxane of Formula 5, it is apparent that the polysiloxane is actually a copolymer of two or more different types of siloxane units. Thus, the organohydrogenpolysiloxane of Formula 5 can be described as a copolymer of one or more types of siloxane units having the formula:

(6) 

where R is as previously defined, $c$ is a whole number equal to from 1 to 2, inclusive, preferably 1, $d$ is a whole number equal to from 0 to 2, inclusive, and the sum of $c$ plus $d$ is a whole number equal to from 1 to 3, inclusive, together with one or more other types of siloxane units having the formula (7) 

where R is as previously defined and $e$ is a whole number equal to from 0 to 3, inclusive. The proportions and types of siloxane units of Formula 6 and of Formula 7 are selected so as to produce a copolymer containing from 0.50 to 1.00 hydrogen atoms per silicon atom and from 1.12 to 2.25 R groups per silicon atom, with the sum of the number of hydrogen atoms and R groups being equal to from 2.02 to 2.40 per silicon atom.

One of the preferred types of organohydrogenpolysiloxanes within the scope of Formula 5 used in preparing the siloxane-oxyalkylene copolymers of the present invention are the triorganosilyl chain-stopped copolymers of diorganosiloxane units and organohydrogensiloxane units having the formula:

(8) 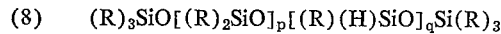

where R is as previously defined, $p$ has an average value of from 0 to 45, inclusive, $q$ has a value at least as great as $p$ and from 3 to 48, inclusive, and the sum of $p$ plus $q$ is equal to from 3 to 48, inclusive, and where the sum of the silicon-bonded R groups plus the silicon-bonded hydrogen is equal to from 2.04 to 2.40 per silicon atom. In the preferred embodiment of my invention, $p$ is 0 and all of the R groups are methyl.

The several reactions which are employed to prepare the siloxane-oxyalkylene copolymer of Formula 1 are relatively straightforward. The reaction between the isocyanate of Formula 2 and the polyalkylene glycol monoether of Formula 3 is effected by merely mixing the two ingredients and heating at an elevated temperature until the reaction is completed. Generally, temperatures of 70 to 100° C. are employed and several hours are required for the reaction. The reaction between the two reactants is sometimes facilitated by the presence of a suitable solvent and a catalyst, such as about 0.10 percent by weight tin octoate.

The reaction between the isocyanate of Formula 2 and the polyalkylene glycol monoether of Formula 3 results in the urethane of Formula 4, which is characterized by a terminal vinyl group. This urethane is then reacted with the organohydrogenpolysiloxane of Formula 5 by heating the two reactants in the presence of a suitable catalyst to effect the addition of the silicon-bonded hydrogen atoms of the siloxane to the vinyl group of the urethane. Generally, a slight excess of the urethane is employed and the preferred types of catalysts are finely divided platinum, as well as platinum compounds and platinum complexes.

The latices which can be employed in the practice of the present invention include natural rubber latex, as well as the latices of the known synthetic rubber and synthetic resin polymers. These latices include, for example, homopolymers of conjugated diolefins, e.g., butadiene, dimethylbutadiene, isoprene, chlorobutadiene, and their homologs; copolymers of such conjugated diolefins with copolymerizable vinyl monomers, e.g., styrene, alphamethyl styrene, acrylonitrile, methacrylonitrile, acrylic acid, methacrylic acid, ethylacrylate, methylmethacrylate, vinyl pyridine, vinyl chloride, etc.; copolymers of such conjugated diolefins with isoolefins, e.g., isobutylene, homologs of isobutylene, vinylidene chloride, etc.; homopolymers of such isoolefins; copolymers of such isoolefins with such copolymerizable vinyl monomers; homopolymers of such vinyl monomers; copolymers of more than one vinyl monomer. From the foregoing description of the various homopolymers and copolymers whose latices can be employed in the practice of the present invention, it is seen that the present invention includes substantially all known latices. The copolymers can be simple copolymers prepared from only two copolymerizable monomers or can include copolymers of many different types of unsaturated monomers. Latices which are copolymers of such multi-component materials derived from more than two copolymerizable monomers are common in the art and include such latices as those derived from copolymers of ethyl acrylate, acrylonitrile and styrene; copolymers of acrylonitrile, butadiene, and methacrylic acid; copolymers of butadiene, isobutylene, and acrylonitrile; copolymers of chlorobutadiene, styrene and vinyl chloride; copolymers of styrene, butadiene, and vinyl pyridine. Other useful latices include, but are not limited to, copolymers of polyvinyl chloride with acrylonitrile or methyl methacrylate and copolymers of vinylidene chloride with acrylic acid. These natural latices can also contain the usual additives or fillers to promote vulcanization, to promote room temperature stability, or to affect the physical properties or appearance of the final product.

Regardless of which of the natural or synthetic latices are employed in the practice of the present invention, these latices comprise a usual aqueous dispersion of polymer, with the solids content of the dispersion being adjustable to any desired degree, but generally falling within the range of from about 25 to 75 percent solids.

The sensitized compositions of the present invention are prepared by simply adding the siloxane-oxyalkylene copolymer of Formula 1 to the latex, employing an amount of the siloxane-oxyalkylene block copolymer necessary to obtain the desired heat-sensitization or coagulation temperature. The coagulation temperature is the temperature at which the sensitized bath and the rubber therein will coagulate into a uniform film about a heated mold or heated probe inserted into the bath. This temperature can be adjusted, depending on the particular latex and the amount of the particular siloxane-oxyalkylene block copolymer, to range from temperatures as low as 30 to 35° C. to temperatures as high as desirable. Generally, it is preferred to adjust bath compositions so that the coagulation temperature is in the range of from about 35 to 60° C. At temperatures below about 35° C., it is possible that the bath will be inadvertently heated to coagulation temperature and cause premature coagulation of the bath. At temperatures much above 70° C., the bath temperature is often hotter than desirable for convenient handling.

The siloxane-oxyalkylene block copolymer of Formula 1, which is a liquid or soft waxy material, can be added to the bath per se, or can be dissolved in water and an aqueous solution thereof added to the bath. Solutions of the siloxane-oxyalkylene block copolymer are often employed for ease of handling. Generally, no advantage is found in employing siloxane-oxyalkylene copolymer solutions containing less than about 50 percent of the copolymer.

The amount of siloxane used to obtain the coagulation temperature ranges previously described are generally in the ratio of from about 0.05 to 10 parts of siloxane-oxyalkylene copolymer per 100 parts by weight of rubber solids in the latex. The heat-sensitized compositions of the present invention have the same general utility as prior art materials and are suitable for making either thin-walled or thick-walled articles by immersion of suitable molds into the sensitized bath. These compositions can also be used for making rubber threads by allowing the composition to flow through externally heated capillary tubes.

The following examples are illustrative of the practice of my invention and are not intended for purposes of limitation. All parts are by weight.

In all of the examples which follow, the siloxane-oxyalkylene copolymers were prepared by the methods described in the aforementioned copending application of Robert J. Boudreau. The preparation of the siloxane-oxyalkylene copolymer used in Example 1 of the present application will be described in detail.

To a reaction vessel was added 1700 parts of a monobutyl ether of an ethylene glycol-propylene glycol copolymer, 91 parts of allyl isocyanate, 500 parts toluene, and 0.85 part tin octoate. The monobutyl ether had been prepared by first condensing butanol with a mixture of ethylene oxide and 1,2-propylene oxide to produce a monobutyl ether containing an average of 17 ethylene oxide and 13 oxypropylene-1,2 groups per molecule. This reaction mixture was heated at 100° C. for 3 hours and the toluene and excess allyl isocyanate were removed by distillation at 150° C. and 10 mm. Then, 187 parts of the urethane prepared above was added to a mixture of 125 parts of a trimethylsilyl chain-stopped methylhydrogenpolysiloxane containing an average of 3 methylhydrogensiloxane units per molecule and sufficient chloroplatinic acid to provide $10^{-5}$ gram atoms of platinum per mole of the urethane. This reaction mixture was heated at a temperature of about 90° C. for a period of 4 to 5 hours to complete the reaction between the silicon-bonded hydrogen atoms and the allyl radicals of the allyl urethane. The resulting product was a liquid having a viscosity of about 1500 centistokes at 25° C. and was a siloxane-oxyalkylene block copolymer within the scope of Formula 1 in which R is methyl, R' is butyl, A is methylene, $n$ has an average value of 2.3, $x$ has a value of 30, $a$ has a value of 0.6, and $b$ has a value of 1.8.

EXAMPLE 1

A three-part composition was made up. Part A of the composition consisted of 210 parts of an acrylonitrile-methacrylic acid copolymer latex having a solids content of 47 percent by weight. Part B consisted of 0.5 part of the siloxane-oxyalkylene copolymer just described, 2.0 parts of a commercial emulsifying agent which was a nonylphenol ether of a polyethylene glycol and 4.0 parts water. Part C consisted of 2.5 parts of colloidal sulfur, 2.5 parts of finely divided zinc oxide, 0.8 part of zinc diethyldithiocarbamate, 0.61 part of a condensation product of sodium naphthylene sulfonate with formaldehyde, and 11.4 parts water. Part B was added to Part A with good agitation and Part C was then added and the mixture was stirred until well mixed. The final composition contained 0.5 part of the siloxane-oxyalkylene copolymer per 100 parts of the acrylonitrile-methacrylic acid copolymer solids. The coagulation temperature of the sensitized latex was determined and found to be 42° C.

EXAMPLE 2

The procedure of Example 1 was repeated, except that instead of the siloxane-oxyalkylene copolymer employed in Example 1, Part B of the composition contained 0.5 part of a siloxane-oxyalkylene copolymer prepared by adding the urethane derived from allyl isocyanate and a nonylphenol-stopped ethylene oxide-propylene oxide polyether to a trimethylsilyl chain-stopped methylhydrogenpolysiloxane containing an average of 3 methylhydrogensiloxane units per molecule. This siloxane-oxyalkylene copolymer had a viscosity of 2200 centistokes at 25° C. and was within the scope of Formula 1 and R is methyl, R' is nonylphenyl, A is methylene, $n$ has an average value of 2.43, $x$ is 30, $a$ has a value of 0.6, and $b$ has a value of 1.8. This sensitized acrylonitrile-methacrylic acid copolymer latex contained 0.5 part of the siloxane-oxyalkylene copolymer per 100 parts of the polymer solids in the latex and had a coagulation temperature of 40° C.

EXAMPLE 3

The procedure of Example 1 was repeated, except that instead of the siloxane-oxyalkylene copolymer of Example 1, Part B of the composition contained 0.5 part of a copolymer prepared by adding the urethane derived from allyl isocyanate and a monobutyl ether of a polyethylene glycol-polypropylene glycol to a trimethylsilyl chain-stopped methylhydrogenpolysiloxane containing an average of 7 methylhydrogensiloxane units per molecule. This copolymer was a clear oil having a viscosity of 1800 centistokes at 25° C. and was within the scope of Formula 1 when R is methyl, R' is butyl, A is methylene, $n$ has an average value of 2.43, $x$ is 30, $a$ has a value of 0.78, and $b$ has a value of 1.44. This sensitized latex contained 0.5 part of the siloxane-oxyalkylene copolymer per 100 parts of latex polymer solids and had a coagulation temperature of 36° C.

EXAMPLE 4

The procedure of Example 1 was repeated, except that instead of the siloxane-oxyalkylene copolymer of Example 1, Part B contained 0.5 part of a copolymer prepared by adding to a trimethylsilyl chain-stopped methylhydrogenpolysiloxane having an average of 10 methylhydrogensiloxane units per molecule, the urethane derived by reacting allyl isocyanate with a monobutyl ether of an ethylene oxide-propylene oxide copolymer. This siloxane-oxyalkylene copolymer had a viscosity of about 2500 centistokes at 25° C. and was within the scope of Formula 1 when R is methyl, R' is butyl, A is methylene, $n$ has an average value of 2.43, $x$ is 30, $a$ has a value of 0.83, and $b$ has a value of 1.33. This composition contained 0.5 part of the siloxane-oxyalkylene copolymer per 100 parts of latex polymer solids and had a coagulation temperature of 36° C.

EXAMPLE 5

Following the procedure of Example 1, except that the siloxane-oxyalkylene copolymer of Part B was replaced with 0.5 part of a siloxane-oxyalkylene copolymer prepared by adding to a trimethylsilyl chain-stopped methylhydrogenpolysiloxane containing an average of 25 methylhydrogensiloxane units per molecule, a urethane prepared by adding allyl isocyanate to the previously mentioned butyl ether of the copolymer of ethylene oxide and propylene oxide. This copolymer was within the scope of Formula 1 when R is methyl, R' is butyl, A is methylene, $n$ has an average value of 2.43, $x$ is 30, $a$ has a value of 0.93, and $b$ has a value of 1.15. This copolymer had a viscosity of 2500 centistokes at 25° C. and was present in an amount of 0.1 part per 100 parts of polymer solids in the latex. The coagulation temperature of this mixture was 34° C.

EXAMPLE 6

Following the general procedure of Example 1, a series of multi-part compositions were made up. Part A of each composition comprised 220 parts of a 43 percent solids acrylonitrile-butadiene-methacrylic acid copolymer latex. Part B of each composition consisted of 1 part of one of the siloxane-oxyalkylene copolymers of Examples 1 through 5, 2 parts of the nonylphenol ether of polyethylene oxide, and 4 parts water. Part C of each composition comprised 2.5 parts colloidal sulfur, 2.5 parts zinc oxide, 0.8 part zinc diethyldithiocarbamate, 0.61 part of a condensation product of sodium naphthylene sulfonate with formaldehyde, and 11.4 parts water. Each of these sensitized compositions was mixed in the manner described in Example 1 and coagulation temperatures measured. In Table I below is listed the coagulation temperature for each of the sensitized latices.

Table I

| Copolymer from: | Coagulation temp., ° C. |
|---|---|
| Example 1 | 75 |
| Example 2 | 70 |
| Example 3 | 70 |
| Example 4 | 60 |
| Example 5 | 45 |

EXAMPLE 7

Varying amounts of a 50 percent solids solution of the siloxane-oxyalkylene copolymer of Example 5 were added to a 50% solids latex of an acrylonitrile-butadiene-methacrylic acid-ethylacrylate copolymer latex and the coagulation temperature was measured for each formulation. In the table below is listed the parts of copolymer per part of rubber solids in the latex and the coagulation temperature.

Table II

| Parts copolymer per 100 parts latex solids: | Coagulation temp., ° C. |
|---|---|
| 0.5 | 58 |
| 1.0 | 53 |
| 1.5 | 47 |
| 2.0 | 41 |

EXAMPLE 8

A sensitized latex was prepared by mixing one part of the siloxane-oxyalkylene copolymer described in Example 5 in a mixture of 200 parts of a 50% solids ethyl acrylate-acrylonitrile-styrene copolymer latex and 4 parts of a 10% aqueous oxalic acid solution. The coagulation temperature of this mixture was 48° C.

EXAMPLE 9

The procedure of Example 1 was repeated with a 3 part mixture in which Part A comprised 167 parts of a 60% solids creamed, natural rubber latex, Part B comprised 1.0 part of the siloxane-oxyalkylene copolymer of Example 5, 2.0 parts of a commercial emulsifying agent which was a nonylphenol ether of a polyethylene glycol, and 4.0 parts water. Part C consisted of 2.5 parts of colloidal sulfur, 2.5 parts of finely divided zinc oxide, 0.8 parts of zinc diethyldithiocarbamate, 0.61 part of a condensation product of sodium naphthylene sulfonate with formaldehyde and 11.4 parts water. After mixing the various parts in the manner of Example 1, the coagulation temperature of the resulting mixture was 55° C.

EXAMPLE 10

A sensitized latex was prepared by mixing 4 parts of the siloxane-oxyalkylene copolymer described in Example 5 into a mixture of 178 parts of a 56% solids solution of a vinyl chloride-acrylic acid copolymer latex and 10 parts oxalic acid. The coagulation temperature of this sensitized latex was 70° C.

While the foregoing examples have illustrated many of the embodiments of my invention, it is understood that my invention relates broadly to both natural and synthetic latices containing the specified amounts of the siloxane-oxyalkylene copolymers described in Formula 1. These compositions are useful as other heat-sensitive latex formulations and have the advantage over such formulations in that they permit sensitization and coagulation of some formulations at moderate temperatures, where with prior art materials, coagulation is obtained only at unreasonably high temperatures. Furthermore, the compositions of the present invention are generally effective at lower concentrations than prior art materials of either a silicone type or a non-silicone type.

What I claim as new and desire to secure by Letters Patent of the United States is:

1. A heat-sensitive composition comprising, by weight, 100 parts of a latex containing a polymer and additionally from 0.05 to 10 parts of a siloxane-oxyalkylene copolymer having the formula:

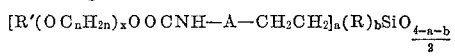

where R is a member selected from the class consisting of monovalent hydrocarbon radicals, halogenated monovalent hydrocarbon radicals and cyanoalkyl radicals, R' is a member selected from the class consisting of lower alkyl radicals and aryl radicals, A is a divalent hydrocarbon radical containing no more than about 7 carbon atoms, $n$ has a value of from 2 to 4, inclusive, $x$ has a value of at least 5, $a$ has a value of from 0.50 to 1.0, inclusive, $b$ has a value of from 1.12 to 1.90, inclusive, and the sum of $a$ plus $b$ is equal to from 2.02 to 2.40, inclusive.

2. The composition of claim 1 in which A is methylene.
3. The composition of claim 1 in which R is methyl and A is methylene.
4. The composition of claim 1 in which R is methyl, A is methylene, and R' is a lower alkyl radical.
5. The composition of claim 1 in which said latex is a latex of a polymer selected from the class consisting of natural rubber, a homopolymer of a conjugated diolefin, a copolymer of a conjugated diolefin with at least one copolymerizable vinyl monomer, a copolymer of a conjugated diolefin with at least one isoolefin, a copolymer of a conjugated diolefin with at least one copolymerizable vinyl monomer and at least one copolymerizable isoolefin, a homopolymer of an isoolefin, a copolymer of an isoolefin and a copolymerizable vinyl monomer; a homopolymer of a polymerizable vinyl monomer, and a copolymer of at least two copolymerizable vinyl monomers.
6. The composition of claim 5 in which R is methyl, A is methylene, and R' is lower alkyl.

References Cited

UNITED STATES PATENTS

| 3,246,048 | 4/1966 | Haluska | 260—46.5 |
| 3,255,141 | 6/1966 | Damm | 260—29.6 |
| 3,388,101 | 6/1968 | Wismer et al. | 260—77.5 |

MURRAY TILLMAN, Primary Examiner

M. J. TULLY, Assistant Examiner

U.S. Cl. X.R.

260—4, 29.6, 29.7, 46.5, 448.2, 824, 827